May 29, 1928.
J. BALDINGER
DECORTICATING FIBERS
Filed April 7, 1925
1,671,219
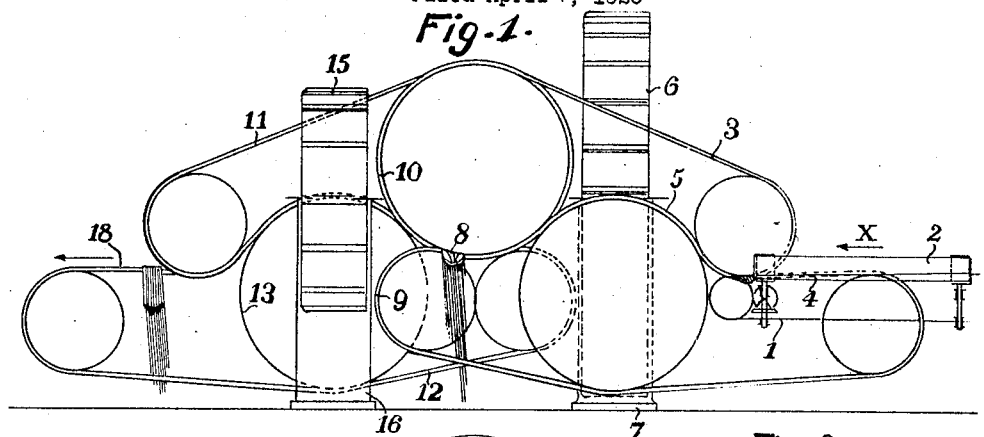
Fig. 1.
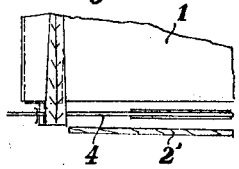
Fig. 6
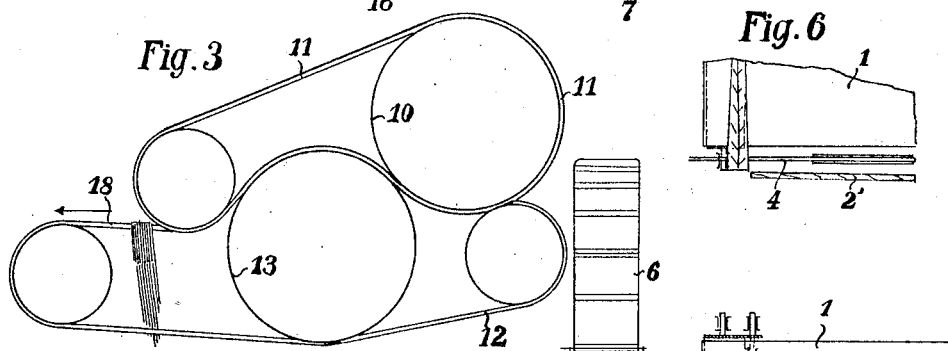
Fig. 3
Fig. 2
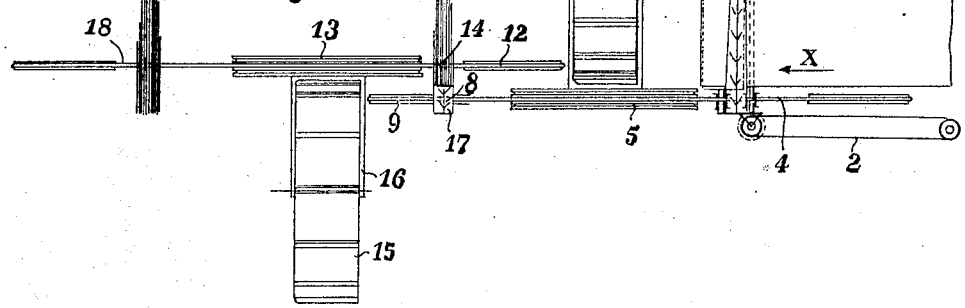
Fig. 4
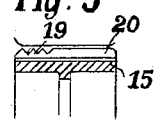
Fig. 5
Inventor
Johann Baldinger
By Knight Bro
Attys Patented May 29, 1928.

1,671,219

UNITED STATES PATENT OFFICE.

JOHANN BALDINGER, OF AMBONI ESTATE, EAST AFRICA.

DECORTICATING FIBERS.

Application filed April 7, 1925, Serial No. 21,449, and in Germany April 19, 1924.

This invention has for its object a method for obtaining fibers from the leaves of agaves and other fibrous plants in which the leaves are conducted through the decorticating machine, which consists of decorticating drums having scrapers or the like, the leaves being placed transversely to the direction of conveying. In the commonly applied methods of decorticating in such machines the leaves to be decorticated are gripped approximately at their middle portions by the conveying means, whereupon the ends of the leaves are successively treated each by one decorticating drum. At the decorticating of the root end of the leaf it was impossible to avoid the loss of the short fibers extending from the root end towards the clamping point, as these fibers were not gripped by the conveying or clamping means which clamp the leaf approximately at the middle.

According to the present invention this inconvenience is avoided, and the method is considerably improved, by gripping or clamping the leaf not as hitherto at the middle portion, but at the root end, at each point of treatment. At the first point of treatment the leaves are decorticated with the exception of a short portion near the root end, and at the second point of treatment this undecorticated portion of the leaf is treated. By clamping the leaf during the first operation as close as possible to the root, when this end is decorticated during the second operation, practically all the fibers are recovered, even the short ones. For the decorticating two knife drums of different diameters are used, the diameters of which are adapted to the length of the respective portions of the leaf which are to be decorticated by each.

The accurate adjusting of the root ends of the leaves required for the carrying out of the improved working method can be easily effected with the aid of a table having a stationary or movable abutment. The abutment is preferably inclined at an acute angle toward the table in the direction of the feeding of the leaves whereby the leaves are moved along the abutment perpendicularly to the conveying direction, the root ends of the leaves being thus accurately adjusted when the leaves are delivered from the table.

An embodiment of the invention is shown by way of example in the accompanying drawing, in which Fig. 1 is a side elevation of one form of machine in accordance with my invention, Fig. 2 is a plan view of the machine shown in Fig. 1 with the upper conveying ropes removed, Fig. 3 is a vertical section on the line 3—3 of Fig. 2, Figs. 4 and 5 show two different forms of stripping knives, the front ends of which are constructed to serve as preliminary crushers, and Fig. 6 is a plan view of a conveying table showing a modified form of abutment.

The conveying table 1 consists of movable belts and has an abutment 2 for adjusting the root ends of the leaves. This abutment is shown in Figs. 1 and 2 as an endless belt mounted at a slight angle with respect to the direction of motion of the conveying table 1 indicated by the arrow $x$. The belt 2 is moved at the same speed as the conveying table 1. The abutment may also take the form of a stationary guide board such as that shown at 2' in Fig. 6. The root ends of leaves which are not properly adjusted when they come in contact with the abutment are shifted in a direction perpendicular to the direction of movement of the table and thereby accurately adjusted. The leaves to be decorticated are transferred from the conveying table 1 in the direction of the arrow $x$ upon conveying means (bands, chains, or the like) and clamped between these conveying means. The conveying means are situated with regard to the conveying table 1, so that the leaves are gripped by the upper ropes 3 and by the lower rope 4 as closely as possible to the root ends. The conveying means 3, 4 clamp the leaves on the conveying disk 5 which conducts the leaves between the beating drum 6 and the breast piece 7. At this occasion the greatest portion of the leaf is decorticated by the beating drum 6 which is of large diameter. Only the short portion of the leaf which is clamped near the root end is not submitted to the decorticating treatment at this point. The leaves, the greatest portion of which has been decorticated, are then conveyed by the ropes 3 and 4 to the point 8 at which the lower rope turns back over the pulley 9 and the upper ropes over the pulley 10 in liberating the leaves which are transferred to a second rope system similar to the first one and composed of the upper ropes 11 and a lower rope 12. This second rope system is displaced in lateral direction with regard to the first rope system so that the portion of the leaves which had been clamped by the first rope system is released and the leaves are gripped, just at the side of the portion 17 which has not yet been decorticated, at the point 14. The leaves are then clamped on a conveying disk 13 and conveyed by this disk between the small sized beating drum 15 and the breast piece 16 so that the undecorticated portion of the leaves is decorticated. The decorticated fibers are delivered from the machine at 18.

According to the present invention the agave leaf, which is mainly used for obtaining fibers, is gripped at its extreme root end, viz, at the point where all the fibers begin which extend through the leaf, so that all the fibers are securely gripped, the flesh being stripped off in the direction from the root end towards the thin point of the leaf. It is easiest to strip the flesh off in this direction, and the loss of fibers is thus reduced to the minimum. It is therefore of advantage that this direction be preserved as much as possible for stripping off the flesh. For removing the flesh from the short root parts of the leaf, which is done by the small sized beating drum 6, the less favorable working towards the foot end is of less importance as in this case the edge fibers, which extend only very little beyond the middle of the leaf, have already been freed of flesh for a sufficient length so that they can be gripped securely.

The working methods according to which the flesh is stripped off from the middle towards the two ends of the leaf or is stripped off at the middle part of the leaf and then toward the two ends have the inconvenience that the short edge fibers of the agave leaf are held either not all or only very insufficiently whereby the waste is increased.

The adjusting of the root ends of the leaves necessary for the exact execution of the improved working method according to the invention presents further great advantages for the subsequent brushing and polishing, as the fibers are delivered from the stripping process having their ends properly adjusted.

It is of advantage to use, instead of the simple beating knives shown in Figs. 1 and 2, the knives shown in Figs. 4 and 5, as the fibers are more carefully treated. The knife, shown in Fig. 4, is inwardly offset from 19 to 20 so that the leaf to be freed of flesh is at first broken and made to conform to the curved breast piece.

As shown in Fig. 5 the offset part is toothed. The use of the offset knife, comprising a breaking part and a stripping part, or the arrangement according to which on one drum breaking knives and on the following drum stripping knives are mounted presents, in comparison with the arrangements according to which the ordinary knives of the beating drums have the combined functions of breaking and stripping, the advantage that the fibrous material is more carefully treated whereby the waste is reduced. Another advantage is that the offset portion of the beating knives provides a larger gap between the knife and the breast piece which permits thick leaves to enter into the space between the knives and the breast piece more easily and therefore their transverse position is not altered so much as where the gap is small and the thick leaves have difficulty in entering.

I claim:

1. The method of obtaining fibers from the leaves of agaves and other fibrous plants by means of two decorticating drums situated one behind the other, which consists in grasping the leaves at the root ends and conveying them along one of said drums with the leaves lying transversely to the direction of conveying to decorticate the leaves with the exception of a short portion at their root ends and then altering the grasping point of the leaves so that the previously grasped portion is liberated and conveying the leaves along the second of said drums to decorticate said short portion at the root ends thereof.

2. The combination with a leaf decorticating machine of the type having two conveyors arranged one beyond the other in the conveying direction and slightly offset with relation to one another so that the second conveyor grasps the leaves at a different point closely adjacent the first gripping point, a decorticating means associated with the first conveyor for decorticating one end of each leaf from the grasping point out, and a decorticating means associated with the second conveyor for decorticating the remainder of the leaf, of means for guiding the leaves to said first conveyor so that they are grasped by said conveyor immediately adjacent their root ends.

3. In a machine of the type described a beating drum, knives on said beating drum comprising a breaking portion and a stripping portion, said breaking portion being inwardly offset in relation to said stripping portion.

4. A machine in accordance with claim 3 in which said breaking portion is toothed.

In testimony whereof I affix my signature.

JOHANN BALDINGER.